Feb. 10, 1942.  C. SAUZEDDE  2,272,327
PISTON SEAL
Original Filed Oct. 30, 1936  2 Sheets-Sheet 1

INVENTOR.
Claude Sauzedde,
BY
ATTORNEY.

Patented Feb. 10, 1942

2,272,327

UNITED STATES PATENT OFFICE 2,272,327

PISTON SEAL

Claude Sauzedde, Detroit, Mich., assignor to Detroit Hydrostatic Brake Corporation, Detroit, Mich., a corporation of Michigan Original application October 30, 1936, Serial No. 108,351, now Patent No. 2,200,305, dated May 14, 1940. Divided and this application May 13, 1940, Serial No. 334,834

4 Claims. (Cl. 60—54.6)

This invention relates to means for sealing chambers in which reciprocating elements are mounted for movement in response to fluid pressure in the chambers, or wherein the elements are to be moved by pressure means arranged externally of the chambers for exerting pressure on fluid in the chambers in which they are mounted, and is a division of my co-pending application, Ser. No. 108,351, filed October 30, 1936, and entitled "Piston seals" (now Patent No. 2,200,-305). It refers more particularly to hydrostatic braking systems wherein pistons movably received in chambers and connected to brake shoes are moved with respect to their chambers by fluid under pressure.

One of the objects of the present invention is to provide a sealing means between the wall of a piston and the wall of a cylindrical chamber in which it operates in response to fluid pressure which is positively non-leakable and which is designed to embody high wear-resisting properties. The sealing means is in the form of an open-ended cylinder and is comprised of elastic material, such as rubber, and this means has an annular, metallic reinforcement surface bonded or vulcanized to each end thereof. In assembling the seal in a brake of the hydrostatic type, one of the metallic reinforcing members is clamped to the wall of the cylinder and the other metallic reinforcing member is clamped to the wall of the piston which operates in the cylinder. This manner of clamping the annular reinforcements to the walls of the cylinder and piston provides for a pair of metal-to-metal contacts and permits the clamping parts to be tightened into such firm engagement that leakage of fluid past the piston is positively prevented. These metal-to-metal contacts are also advantageous in that they permit sealing elements of the deformable, soft metal type to be positioned between the clamped parts to enhance the sealing action and render it absolutely positive.

Another object is to provide a new and improved seal at the wheel brake of a hydrostatic braking system which is more easily assembled and less needful of adjustments and repairs than heretofore.

With the above and other ends in view the invention consists in matters hereinafter more particularly set forth with reference to the accompanying drawings, in which Figure 1 is a vertical section of the structure at the wheel brake;

Like characters of reference are employed throughout to designate corresponding parts.

Figure 1:
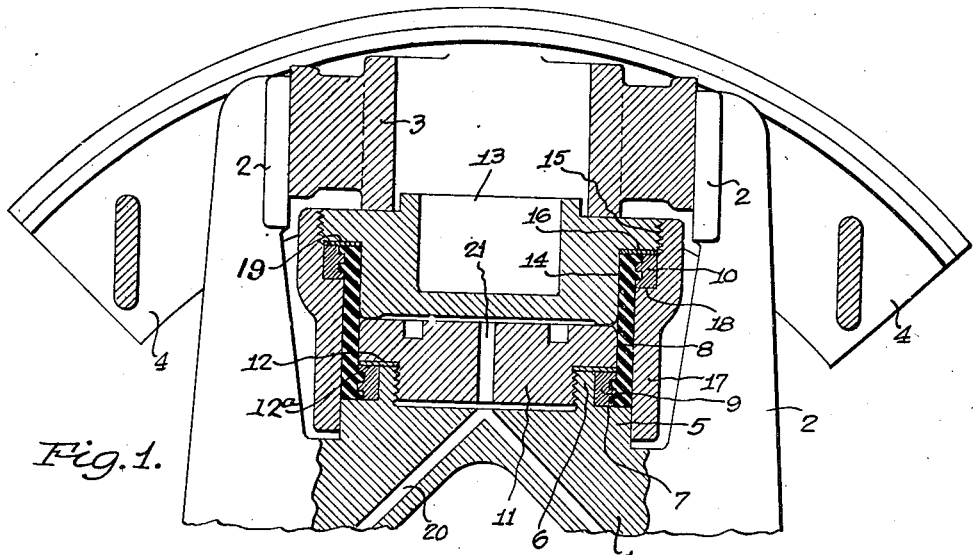
Figure 2:
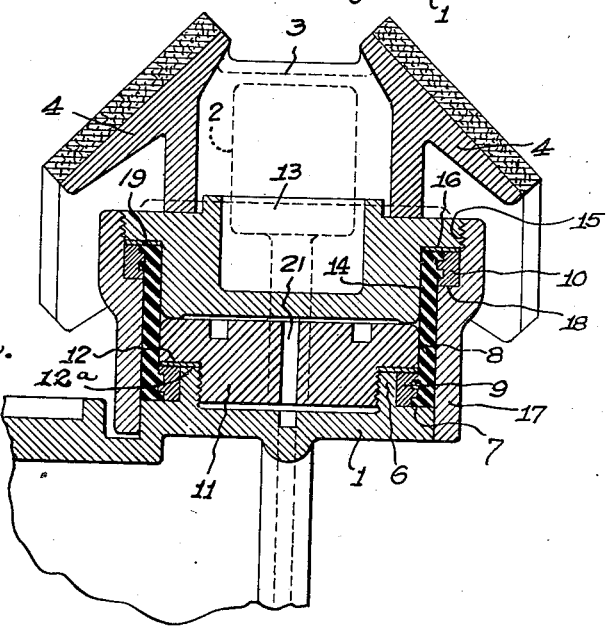
Fig. 2 is a vertical section taken on a plane transverse to Fig. 1.

The numeral 1 designates a fragment of a spider such as ordinarily provides the support for brakes within a vehicle wheel. Such spiders and brake assemblies with respect to vehicle wheels are already well known in the art and, therefore, are not shown in detail here. Integral with the spider are two guide arms 2 between which a bridge member 3, supporting brake shoes 4, is slidable radially. Between the arms 2 the spider is formed with a cylindrical projection 5 with its axis extending radially. At its outer end the cylindrical projection 5 has a co-axial, internally threaded, annular formation 6 the outer diameter of which is less than the diameter of the projection 5 so as to form a shoulder 7. The face of the shoulder 7 is formed in a plane normal to the axis of the annular formation 6 and is smoothly machined.

A cylindrical body or sleeve 8, formed of rubber, has an annular, metallic reinforcement 9 surface bonded to its lower end, the reinforcement being internally disposed with respect to the end of the sleeve and having serrations on its external surface for increasing the tenacity of the surface bonding. The end of the sleeve 8 may be vulcanized to the reinforcement 9, for example, or it may be secured thereto by suitable adhesives. At its other end the sleeve 8 has another annular, metallic reinforcement 10 surface bonded thereto, externally thereof, the inner surface of said reinforcement also being provided with serrations for reasons similarly as above.

Received in the annular formation 6 is a screw-threaded clamping element 11 having a shoulder 12 which bears against the annular reinforcement 9 to press the latter into firm engagement with the shoulder 7. A deformable sealing element 12a, that is, a sealing element of soft metal, such as aluminum, is placed between the shoulder 12 and the reinforcement 9 and extends along and between said shoulder and the end surface of the annular formation 6. By tightening the clamping element 11, the contacting surfaces of the shoulder 7, annular reinforcement 9 and shoulder 12 may be brought into such firm engagement that passage of fluid therebetween is impossible.

Loosely received between the arms 2 is an element 13 having a cylindrical formation 14 disposed within the upper end of the sleeve 8. The upper end of the element 13 supports the bridge member 3 and this end is provided with an externally threaded portion 15 and a shoulder 16. A hollow cylindrical body 17, formed with an internal shoulder 18, is screwthreaded onto the screwthreaded portion 15 and the annular reinforcement 10 is clamped between the shoulders 16 and 18 thereby. A deformable seal 19, similar to the seal 12a and formed of aluminum, for example, is positioned between the annular reinforcement 10 and the shoulder 16. The hollow cylindrical body 17 encloses the elastic sleeve 8 and its lower end finds bearing on the cylindrical projection 5.

The spider 1 is provided with passages 20 which communicate with a port 21 extending through the clamping element 11 and serve to convey fluid under pressure to the space between the elements 11 and 13. When fluid under pressure is introduced to this space, the element 13 moves radially outwardly with respect to the spider 1 and engages the bridge member 3 to force the brake shoes 4 outwardly. During such movement of the element 13, the elastic sleeve 8 is stretched but is prevented from expanding radially of itself by the confining surfaces of the cylindrical body 17. The two elements 11 and 13 are maintained in co-axial alignment during such movement by engagement of the lower end of the hollow cylindrical body 17 with the cylindrical projection 5.

Figure 3:
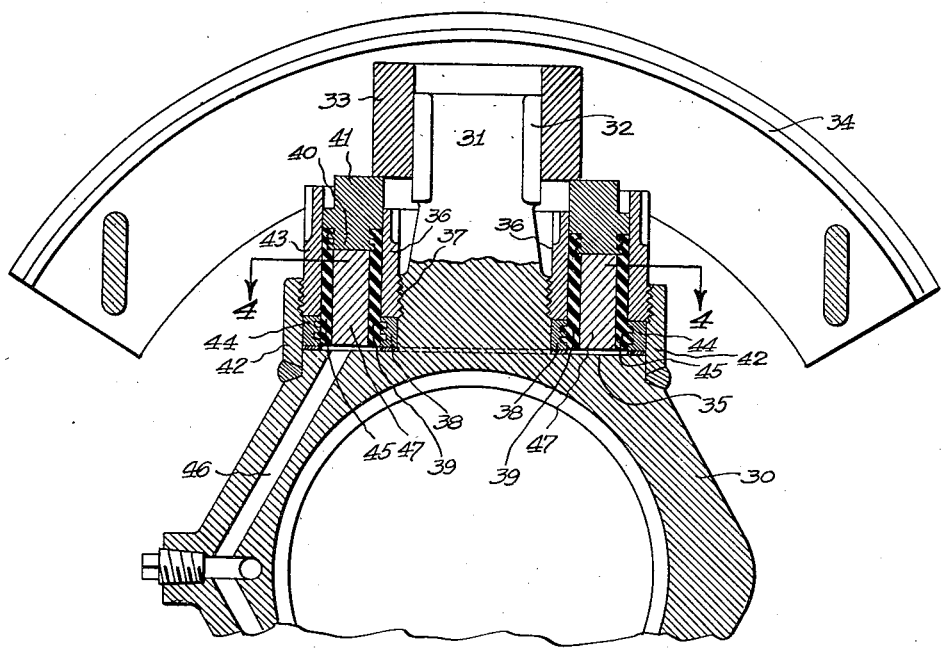
Fig. 3 is a vertical section of a modified brake construction.
Figure 4:
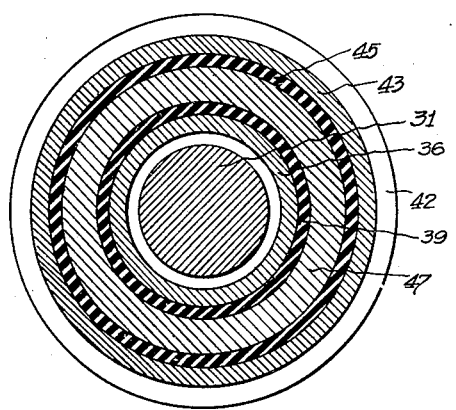
Fig. 4 is a view taken on the line 4—4 of Fig. 3.

Referring to Figs. 3 and 4, there is illustrated a stationary spider 30 having a radially projecting shank 31 with guide portions 32. Slidably received upon the guide surfaces 32 is a cross member 33 which supports a pair of brake shoes 34, one of said shoes being shown in Fig. 3. At the base of the shank 31 is provided a shoulder 35, and a cylindrical retainer 36, which is secured upon a screwthreaded portion 37 of said shank, clamps an annular metallic reinforcement 38 against the shoulder 35. An elastic seal 39 has one end thereof surface bonded to the reinforcement 38 and its other end is surface bonded to an annular projection 40 on a movable element 41. Surrounding the base of the shank 31 is an annular formation 42 screwthreadedly receiving a retainer 43 which clamps an annular metallic reinforcement 44 against the shoulder 35. One end of an elastic sleeve 45 is surface bonded to the inner surface of the annular reinforcement 44 and its other end is surface bonded to the annular projection 40 on the movable element 41.

The two sleeves 39 and 45 are thus concentrically disposed and the space therebetween constitutes a fluid pressure chamber. The spider 30 is provided with passages 46 for conveying fluid under pressure to the space between the two concentric, elastic sleeves. An annular filler 47 is mounted between the two sleeves 39 and 45 to occupy a major portion of the space therebetween so as to reduce the amount of fluid necessary to fill such space.

When fluid under pressure is supplied through the passages 46 to the pressure chamber formed as above described, it acts upon the filler 47 and the annular projection 40 to move the movable element 41 outwardly with respect to the shank 31. During such movement, the movable element 41 engages the cross member 33 and forces the shoes 34 outwardly for contact with a brake drum. The usual springs, not shown, are used to retract the shoes and to move the cross member 33 and movable element 41 back to the position shown in Fig. 3.

Figure 5:
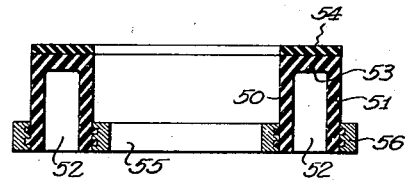
Fig. 5 is a section of another form of seal.

In Fig. 5, there is shown a modified seal adapted for assembly in a brake construction, such as shown in Fig. 3. In this form the seal comprises inner and outer annular walls 50 and 51, respectively, the two walls being of different diameters whereby a space 52 is provided therebetween. The space between the two walls 50 and 51 is closed at one end by an integral annular wall 53 preferably having a comparatively hard surface portion, as indicated at 54. Surface bonded internally to the open end of the wall 50 is an annular metallic reinforcement 55 and surface bonded externally to the outer wall 51 is an annular metallic reinforcement 56.

In assembling the seal shown in Fig. 5, in a brake such as shown in Fig. 3, the two reinforcements 55 and 56 are clamped against the shoulder 35 by retainers, such as shown at 36 and 43, respectively.

Although a specific embodiment of the invention has been illustrated and described, it will be understood that various changes may be made within the scope of the appended claims without departing from the spirit of the invention, and such changes are contemplated.

What I claim is:

1. In a hydrostatic brake, a movable brake actuator, a stationary support for said actuator, a fluid chamber formed between said actuator and said support, means for conveying fluid under pressure to said chamber for actuating said actuator, an open-ended, cylindrical, flexible sealing member arranged between said actuator and said support for sealing said fluid within said chamber, an annular metallic member connected in sealed relationship to each end of said sealing member and anchored one to said actuator and one to said support for reinforcing said ends and providing a unitary structure comprising said actuator, said support, said sealing member and said metallic members, and another pair of annular metallic members one arranged between said actuator and one of said first annular members and the other arranged between said support and the other of said first annular members.

2. In a hydrostatic brake, a movable brake actuator, a stationary support for said actuator, a fluid chamber formed between said actuator and said support, means for conveying fluid under pressure to said chamber for actuating said actuator, an open-ended, cylindrical, flexible sealing member arranged between said actuator and said support for sealing said fluid within said chamber, a pair of annular metallic members connected in sealed relationship one to one end of said sealing member exteriorly of the latter and the other to the other end of said sealing member interiorly of the latter and anchored one to said actuator and one to said support for reinforcing said ends and providing a unitary structure comprising said actuator, said support, said sealing member and said metallic members, and another pair of annular metallic members one arranged between said actuator and one of said first annular members and the other arranged between said support and the other of said first annular members.

3. In a hydrostatic brake, a movable brake actuator formed with a pair of concentrically arranged, annular surfaces, a stationary support for said actuator and formed with an annular surface substantially equal in diameter to the inner surface of said pair, a fluid chamber formed between said actuator and said support within the confines of said inner surface, means for conveying fluid under pressure to said chamber for actuating said actuator, an open-ended, cylindrical, flexible sealing member arranged between said surfaces of said pair and about said third surface for sealing said fluid within said chamber, an annular metallic member connected in sealed relationship to each end of said sealing member and anchored one to said actuator and one to said support for reinforcing said ends and providing a unitary structure comprising said actuator, said support, said sealing member and said metallic members, and another pair of annular metallic members one arranged between said actuator and one of said first annular members and the other arranged between said support and the other of said first annular members.

4. In a hydrostatic brake, a movable brake actuator formed with a pair of concentrically arranged, annular surfaces, a stationary support for said actuator and formed with an annular surface substantially equal in diameter to the inner surface of said pair, a fluid chamber formed between said actuator and said support within the confines of said inner surface, means for conveying fluid under pressure to said chamber for actuating said actuator, an open-ended, cylindrical, flexible sealing member arranged between said surfaces of said pair and about said third surface for sealing said fluid within said chamber, a pair of annular metallic members connected in sealed relationship one to one end of said sealing member exteriorly of the latter and the other to the other end of said sealing member interiorly of the latter and anchored one to said actuator and one to said support for reinforcing said ends and providing a unitary structure comprising said actuator, said support, sealing member and said metallic members, and another pair of annular metallic members one arranged between said actuator and one of said first annular members and the other arranged between said support and the other of said first annular members.

CLAUDE SAUZEDDE.